United States Patent
Löbbert

(10) Patent No.: US 12,209,968 B2
(45) Date of Patent: Jan. 28, 2025

(54) OPTICAL SENSOR ELEMENT, OPTICAL PH SENSOR AND METHOD FOR MONITORING THE FUNCTION OF AN OPTICAL PH SENSOR

(71) Applicant: Endress+Hauser Conducta GmbH+Co. KG, Gerlingen (DE)

(72) Inventor: Andreas Löbbert, Waldheim (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 254 days.

(21) Appl. No.: 17/557,800

(22) Filed: Dec. 21, 2021

(65) Prior Publication Data
US 2022/0196561 A1    Jun. 23, 2022

(30) Foreign Application Priority Data
Dec. 21, 2020    (DE) .................... 10 2020 134 517.8

(51) Int. Cl.
*G01N 21/64* (2006.01)
*G01N 21/77* (2006.01)
*G01N 31/22* (2006.01)

(52) U.S. Cl.
CPC ......... *G01N 21/7703* (2013.01); *G01N 21/64* (2013.01); *G01N 31/22* (2013.01); *G01N 31/221* (2013.01)

(58) Field of Classification Search
CPC .................................................. G01N 31/221
See application file for complete search history.

(56) References Cited

U.S. PATENT DOCUMENTS

| | | | |
|---|---|---|---|
| 6,602,716 B1* | 8/2003 | Klimant ............. | G01N 21/6428 436/805 |
| 2018/0164263 A1* | 6/2018 | Fischer .............. | G01N 21/6428 |

FOREIGN PATENT DOCUMENTS

WO    WO-02056023 A1 *    7/2002    ......... G01N 21/6428

* cited by examiner

*Primary Examiner* — Christine T Mui
*Assistant Examiner* — Michelle Adams
(74) *Attorney, Agent, or Firm* — Kelly J. Smith; Endress+Hauser (USA) Holding, Inc.

(57) ABSTRACT

The present disclosure relates to an optochemical sensor element comprising: a substrate layer having a first substrate side facing toward a measurement medium and an opposite second substrate side; a functional layer, on the first substrate side and having a first reference dye, an indicator dye, and a second reference dye, wherein the first reference dye comprises an inorganic material, is insensitive to pH, and is suitable to emit a first luminescence signal upon stimulation, wherein the indicator dye comprises an organic material and is sensitive to pH, and is suitable to emit a third luminescence signal upon stimulation, wherein the second reference dye comprises an organic material, is insensitive to pH, and has a passivated functional group, and is suitable to emit a second luminescence signal upon stimulation, wherein the substrate layer is transparent to the stimulation signal and the luminescence signals.

20 Claims, 4 Drawing Sheets

OPTICAL SENSOR ELEMENT, OPTICAL PH SENSOR AND METHOD FOR MONITORING THE FUNCTION OF AN OPTICAL PH SENSOR

CROSS-REFERENCE TO RELATED APPLICATION

The present application is related to and claims the priority benefit of German Patent Application No. 10 2020 134 517.8, filed on Dec. 21, 2020, the entire contents of which are incorporated herein by reference.

TECHNICAL FIELD

The present disclosure relates to an optical sensor element, an optical pH sensor and a method for monitoring the function of an optical pH sensor.

BACKGROUND

In analytical measurement technology in the fields of water management, of environmental analysis, in industry, for example in food technology, biotechnology, and pharmaceutics, as well as for the most varied laboratory applications, measurands, such as the pH value, the conductivity, or even the concentration of analytes, such as ions or dissolved gases in a gaseous or liquid measurement medium, are of great importance. These measurands can be acquired and/or monitored, for example, by means of electrochemical sensors, such as optical, potentiometric, amperometric, voltammetric, or coulometric sensors, or even conductivity sensors.

Optical pH sensors are sensors that are based on an optochemical reaction with the measurement medium. As a rule, these sensors comprise a luminescent material suitable to emit light when the material is stimulated by a light source. The luminescent material is simultaneously sensitive to pH so that the light emitted by the luminescent material is influenced by the pH value of the measurement medium.

Known problems of previous optical pH sensors are large ionic strength dependence, temperature dependence, and low drift stability. Ionic strength dependence and temperature dependence are due to the measurement medium, and can thus be controlled if the pH sensor is used only in a specific application scope, e.g., below 80° C. The drift of the pH sensor causes distorted measurements of the pH sensor. Currently used pH sensors typically have labile fluorophores or fluorescein derivatives, which already begin to drift after a short time. The reason for this is photobleaching and leaching of the indicator dye. The photobleaching of the indicator dye occurs by oxidation; the leaching of the indicator dye occurs by the washing out of the indicator dye. Over time, more and more stable fluorophores, which leach less due to a smaller number of polar groups, have been discovered in university research. Nevertheless, the problem of drift stability due to photobleaching still remains.

SUMMARY

It is therefore an object of the present disclosure to enable an optical pH measurement that can be realized reliably and simply. This object is achieved according to the present disclosure by an optochemical sensor element for an optochemical pH sensor. The optochemical sensor element according to the present disclosure comprises: a substrate layer having a first substrate side facing toward a measurement medium and a second substrate side opposite the first substrate side; a functional layer that is arranged on the first substrate side and has a first reference dye, an indicator dye, along with a second reference dye different from the first reference dye, wherein the first reference dye comprises an inorganic material, is insensitive to pH, and is suitable to emit a first luminescence signal upon stimulation with a first stimulation signal, wherein the indicator dye comprises an organic material and is sensitive to pH, and is suitable to emit a third luminescence signal upon stimulation with the first stimulation signal, wherein the second reference dye comprises an organic material, is insensitive to pH, and has a passivated functional group, and is suitable to emit a second luminescence signal upon stimulation with the first stimulation signal, wherein the substrate layer is transparent to the stimulation signal and the luminescence signals.

Using the optochemical sensor element according to the present disclosure, it is made possible to recognize and quantify a drift of the sensor in order to compensate the measured values determined by the sensor with respect to the determined drift. Since the optochemical sensor element has two different reference dyes and one reference dye comprises the same drift properties as the indicator dye, a drift of the indicator dye can be indirectly ascertained by recognizing a drift of the reference dye. For this purpose, only the two reference dyes have to be compared to one another. By means of the optochemical sensor element according to the present disclosure, it is possible to check an optochemical pH sensor for drift during ongoing operation and to compensate the current measured values depending on the ascertained drift. Thus, the optochemical pH sensor does not have to be removed from the measuring point in order to ascertain a drift of the pH sensor in a medium with a known pH value. The work effort for operating the pH sensor is thereby minimized, and the quality of the measurement results is maximized.

According to one embodiment of the present disclosure, the functional layer is subdivided into at least two functional segments, wherein a first functional segment has the first reference dye, the indicator dye, and the second reference dye, wherein a second functional segment has the first reference dye and the indicator dye, or the first reference dye and the second reference dye, or the indicator dye and the second reference dye.

According to one embodiment of the present disclosure, a comparison layer with a first comparison segment is arranged on the second substrate side of the substrate, wherein the first comparison segment has the first reference dye, the second reference dye, or the indicator dye.

According to one embodiment of the present disclosure, the comparison layer has a plurality of comparison segments, wherein each comparison segment has the first reference dye, the second reference dye, or the indicator dye.

According to one embodiment of the present disclosure, the functional layer is subdivided into at least three functional segments, wherein a first functional segment has the first reference dye, a second functional segment has the indicator dye, and a third functional segment has the second reference dye that is different from the first reference dye and has a passivated functional group.

According to one embodiment of the present disclosure, the functional layer has more than three functional segments and each functional segment has a different dye or a different combination of dyes.

According to one embodiment of the present disclosure, the functional layer is circular and the functional segments are formed by a radial subdivision of the functional layer, or wherein the functional layer is rectangular and the segments are formed by a rectangular subdivision of the functional layer.

According to one embodiment of the present disclosure, the functional layer has a proton-conducting matrix, and the first inorganic reference dye and/or the organic indicator dye and/or the second inorganic reference dye is arranged homogeneously in the proton-conducting matrix.

According to one embodiment of the present disclosure, the optochemical sensor element furthermore has a selection layer, which is arranged on the functional layer opposite the substrate layer and is permeable to protons.

According to one embodiment of the present disclosure, the functional segments are each in contact, with a first side surface, with the substrate layer or a further layer and are in contact, with a second side surface opposite the first side surface, with the selection layer or a further layer or a measurement medium.

According to one embodiment of the present disclosure, the first reference dye has a material from a group: titanate, nitride, gallate, sulfide, sulfate, aluminate, silicate, preferably Han blue, Han purple, Egyptian blue, ruby red, aluminoborate, chromated yttrium aluminum borate, gadolinium aluminum borate, manganese (IV)-(doped) activated magnesium titanate, manganese (IV)-activated magnesium fluorogermanate, ruby, alexandrite, and/or europium (III)-activated yttrium oxides.

According to one embodiment of the present disclosure, the indicator dye has a material from a group: BODIPY, aza-BODIPY, porphyrine, phthalocyanine, sterically hindered coumarins, perylene diimides, merocyanines, diketopyrrolopyrrole (DPP), quinacridones (QD), 7-[2-(decyloxycarbonyl)-phenyl]-10-diethylamino-3-hydroxy-benzo[c]xanthylium perchlorate (XP), azadioxatriangulenium (ADOTA), diazaoxatriangulenium (DAOTA), pyranine (HPTS), 6-8-dihydroxypyrene-1,3-disulfonic acids (DHPDS), fluoresceins and their derivatives, or mixtures.

According to one embodiment of the present disclosure, the second reference dye is a product of reaction of the indicator dye by esterification, etherification, or amidation.

According to one embodiment of the present disclosure, the optochemical sensor element has at least one further layer, which is arranged on the substrate layer and/or the functional layer and/or the selection layer, wherein the further layer is, for example, a protective layer, a darkening layer, a support layer, or a barrier layer.

The object according to the present disclosure is further achieved by an optochemical pH sensor. The optochemical sensor according to the present disclosure comprises: a sensor body having a light source, a photodetector, and a control unit, wherein the control unit is connected to the light source and to the photodetector, and is suitable to control the light source and evaluate the signals detected by the photodetector; a sensor head having an optochemical sensor element according to the present disclosure; wherein the sensor body and the sensor head are arranged in such a way that the light source is suitable to emit at least one simulation signal in such a way that the optochemical sensor element is irradiated by the stimulation signal, wherein the photodetector is suitable to detect luminescence signals emitted by the optochemical sensor element.

According to one embodiment of the present disclosure, the photodetector has a filter unit, which is suitable to filter a first luminescence signal emitted by the first reference dye, a second luminescence signal emitted by the second reference dye, and a third luminescence signal emitted by the indicator dye.

According to one embodiment of the present disclosure, the optochemical pH sensor furthermore has an optical waveguide having at least two conductor fibers, and the light source is suitable to generate at least two independent stimulation signals, wherein a first conductor fiber is arranged in such a way that a first stimulation signal is directed onto a first functional segment, and a second conductor fiber is arranged in such a way that a second stimulation signal is directed onto a second functional segment.

According to one embodiment of the present disclosure, the optical waveguide has a third conductor fiber and a comparison segment is arranged at one end of the third conductor fiber. The object according to the present disclosure is further achieved by a method for monitoring the function of an optochemical pH sensor according to the invention. The method according to the present disclosure comprises at least the following steps: providing an optochemical pH sensor according to the present disclosure, controlling the light source by means of the control unit so that a first stimulation signal is emitted onto the optochemical sensor element in order to stimulate the first reference dye, the second reference dye, and the indicator dye, detecting a first luminescence signal, a second luminescence signal, and a third luminescence signal by means of the photodetector, comparing, by means of the control unit, the first luminescence signal emitted by the first reference dye to the second luminescence signal emitted by the second reference dye, determining a reference signal difference or a reference signal ratio between the first luminescence signal and the second luminescence signal, determining a measurement signal difference or a measurement signal ratio between the first luminescence signal and the third luminescence signal, determining the pH value of the measurement medium based on the determined measurement signal difference and the reference signal difference or on the measurement signal ratio and the reference signal ratio.

According to one embodiment of the present disclosure, a warning message is output by the control unit if the measurement signal difference, the reference signal difference, the measurement signal ratio, or the reference signal ratio exceeds or falls below a predetermined limit value.

According to one embodiment of the present disclosure, the optochemical pH sensor furthermore has an optical waveguide having at least two conductor fibers, and the light source is suitable to generate at least two independent stimulation signals, wherein a first conductor fiber is arranged in such a way that a first stimulation signal is directed onto a first functional segment, and a second conductor fiber is arranged in such a way that a second stimulation signal is directed onto a second functional segment, wherein the step of controlling the light source by means of the control unit is performed in such a way that a first stimulation signal is emitted onto a first functional segment by means of the first conductor fiber, and a second stimulation signal is emitted onto a second functional segment by means of the second conductor fiber in a time-delayed manner or simultaneously with the first stimulation signal.

BRIEF DESCRIPTION OF THE DRAWINGS

The present disclosure is explained in more detail on the basis of the following description of the figures. The following are shown.

DETAILED DESCRIPTION

Figure 1:
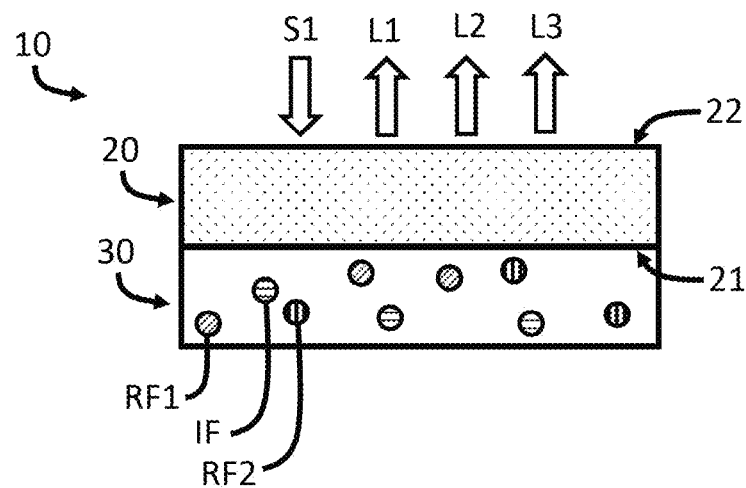
FIG. 1 shows a schematic illustration of an optochemical sensor element according to the present disclosure.

FIG. 1 shows an exemplary embodiment of an optochemical sensor element 10 for an optochemical pH sensor 1. The optochemical sensor element 10 is intended to be used in an optochemical pH sensor 1 in order to determine a pH value of a measurement medium with which the optochemical pH sensor 1 is in contact.

The optochemical sensor element 10 comprises a substrate layer 20 having a first substrate side 21 and a second substrate side 22. The first substrate side 21 is the side of the substrate layer 20 facing toward the measurement medium. A functional layer 30 is arranged on the first substrate side 21 (see FIGS. 1-7). The functional layer 30 faces toward the measurement medium and is configured to come into contact, at least into ionic contact, with the measurement medium. Depending on the embodiment, a comparison layer 60 having at least one first comparison segment 61 can be arranged on the second substrate side 22 (see embodiments of FIGS. 3-5). The comparison layer 60 faces away from the measurement medium and is intended to not come into contact with the measurement medium.

The functional layer 30 has a first reference dye RF1, an indicator dye IF, and a second reference dye RF2 different from the first reference dye RF1. As shown in FIG. 1, the functional layer 30 can be designed as a single piece. As shown in FIGS. 2-7, the functional layer 30 can alternatively also be of multi-piece design.

If luminescence, or a luminescence signal, is referred to below, this means fluorescence or a fluorescence signal and/or phosphorescence or a phosphorescence signal. Organic dyes generally have fluorescence and inorganic dyes generally have phosphorescence.

The first reference dye RF1 comprises an inorganic phosphorescent material and is suitable to emit a first luminescence signal L1 upon stimulation with a first stimulation signal S1. The first stimulation signal S1 preferably has a wavelength range of 400 nm to 600 nm or of 500 nm to 600 nm. The first luminescence signal L1 preferably has a wavelength range of 600 nm to 1100 nm.

The fluorescent indicator dye IF comprises an organic material, is sensitive to pH, and is suitable to emit a second luminescence signal L2 upon stimulation with the first stimulation signal S1. The second luminescence signal L2 is preferably in a wavelength range of 400 nm to 1100 nm. Preferably, the second luminescence signal L2 has a wavelength range of 600 nm to 1100 nm. Here, "sensitive to pH" means that the second luminescence signal L2 is dependent on the pH value of the measurement medium so that an intensity and/or a decay time of the second luminescence signal L2 is dependent on the pH value of the measurement medium.

The second fluorescent reference dye RF2 comprises an organic material and has a passivated functional group. The functional group that is passivated in the second organic reference dye RF2 is present in the indicator dye IF as an active functional group. In principle, the second organic reference dye RF2 thus differs from the indicator dye IF only by the passivated group. The active functional group gives the indicator dye IF its pH sensitivity.

The second organic reference dye RF2 is suitable to emit a third luminescence signal L3 upon stimulation with the first stimulation signal S1. The third luminescence signal L3 has a wavelength range of 400 nm to 1100 nm. The third luminescence signal L3 preferably has a wavelength range of 600 nm to 1100 nm.

The substrate layer 20 is preferably transparent to the stimulation signal S1 and the luminescence signals L1, L2, L3.

Figure 2:
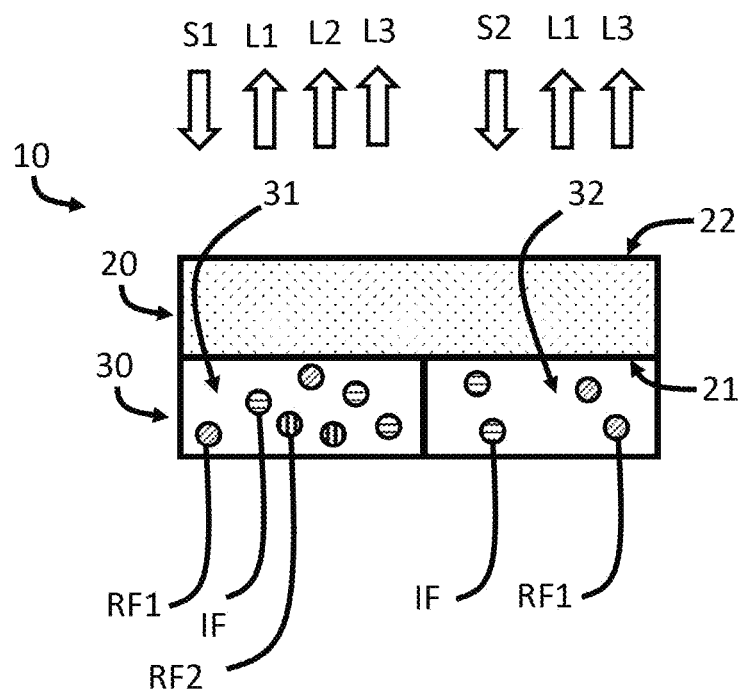
FIG. 2 shows a schematic illustration of an alternative embodiment of the optochemical sensor element shown in FIG. 1.

FIG. 2 shows an embodiment of the optochemical sensor element 10 with a multi-piece functional layer 30. The functional layer 30 is subdivided into two functional segments 31, 32 in FIG. 2. Of course, it is also possible to subdivide the functional layer 30 into more than two functional segments.

In the embodiment shown in FIG. 2, the first functional segment 31 has the first reference dye RF1, the indicator dye IF, and the second reference dye RF2. The second functional segment 32 has the first reference dye RF1 and the indicator dye IF.

In an alternative embodiment (not shown), the second functional segment 32 has the second reference dye RF2 and the indicator dye IF or the first reference dye RF1 and the second reference dye RF2.

The second functional segment 32 makes it possible to apply a so-called ratiometric measurement method. The ratiometric measurement method is discussed in detail later. Likewise, the second functional segment 32 makes it possible to stimulate predetermined areas of the optochemical sensor element 10, namely the first functional segment 31 and the second functional segment 32, with different stimulation signals S1, S2, which, for example, have different wavelengths and/or are emitted at different points in time. Likewise, the separate arrangement of segments makes it possible to separately detect the luminescence signals of the dyes arranged in the segments. The optochemical pH sensor 1 is discussed in more detail later.

Figure 3:
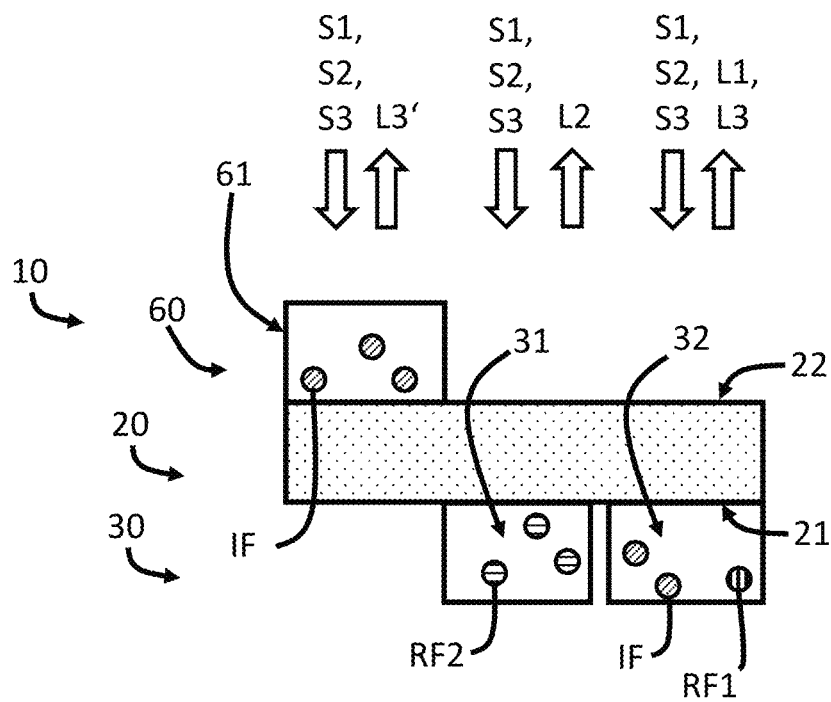
FIG. 3 shows a schematic illustration of a further alternative embodiment of the optochemical sensor element shown in FIG. 1.
Figure 4:
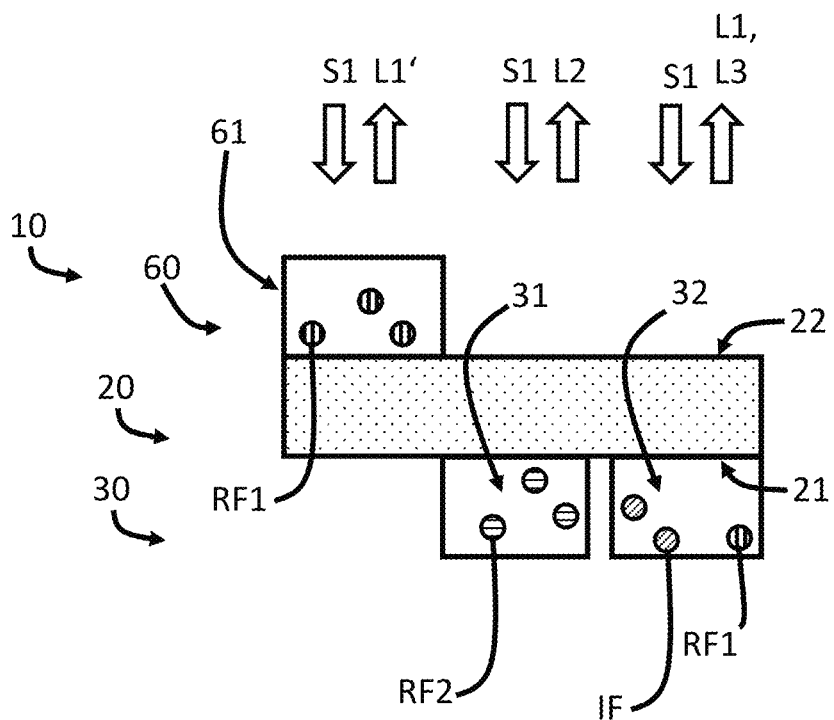
FIG. 4 shows a schematic illustration of an optochemical pH sensor according to the present disclosure.

FIG. 3 shows an embodiment in which the functional layer 30 is subdivided into two functional segments 31, 32. The two functional segments 31, 32 each have a different dye. The first functional segment 31 has the second reference dye RF2; the second functional segment 32 has the indicator dye IF. In addition, the comparison layer with a first comparison segment 61 is mounted on the second substrate side. The first comparison segment 61 has the indicator dye IF.

By dividing the dyes RF2, IF into separate functional segments 31, 32, 61, it is possible to stimulate the dyes RF2, IF with different stimulation signals S1, S2, S3 or identical stimulation signals, or to detect the luminescence signals L3', L2, L3 emitted by the dyes RF2, IF separately.

Of course, it is possible to subdivide the functional layer 30 into more than three functional segments, for example in order to arrange dye combinations of the first reference dye RF1 and/or the second reference dye RF2 and/or the indicator dye IF for a ratiometric measurement method in the further functional segments.

The functional layer 30 of the optochemical sensor element 10 is circular, for example. If the circular functional layer 30 has functional segments 31, 32, 33, these are formed by a radial subdivision of the functional layer 30.

The functional layer 30 of the optochemical sensor element 10 may also have a rectangular shape. In this case, the functional segments 31, 32, 33, 34 are formed by a rectangular subdivision of the functional layer 30. It is inherently understood that other shapes of the functional layer 30 and of the functional segments are also possible.

In one embodiment compatible with the embodiments described above, the functional layer 30 has a proton-conducting matrix. In this case, the first inorganic reference dye RF1 and/or the organic indicator dye IF and/or the second organic reference dye RF2 is arranged homogeneously in the proton-conducting matrix.

By means of a homogeneous arrangement of dyes RF1, RF2, IF in a proton-conducting matrix, it is achieved that crosstalk/energy transfer of excited and non-excited dyes does not occur.

By introducing materials having a large surface area and a covalent bonding to the surface of the proton-conducting matrix, an optimally drift-stable membrane with the lowest possible loading is created.

Figure 7:
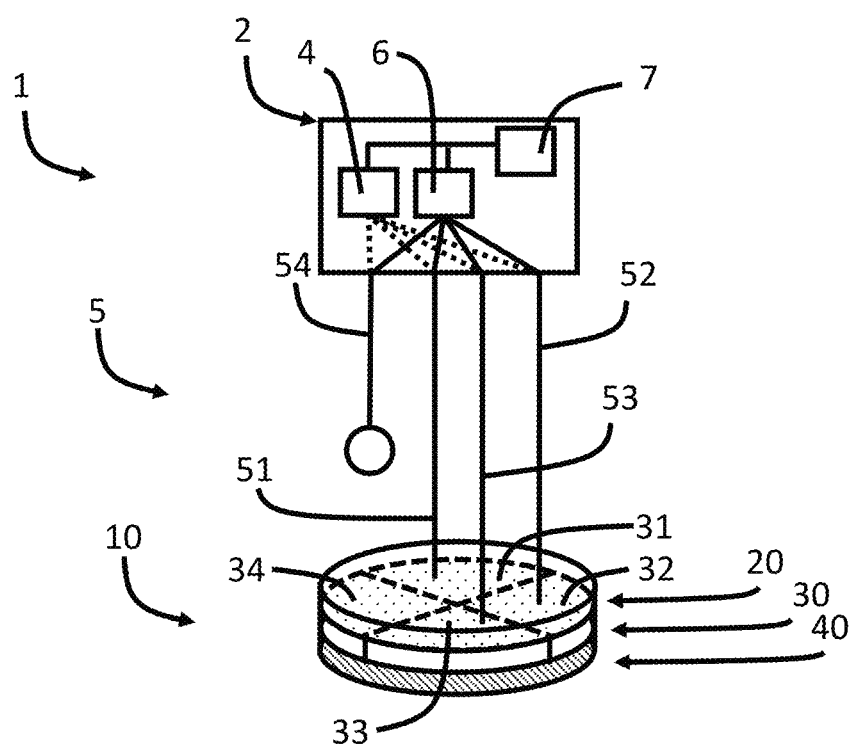
FIG. 7 shows a schematic illustration of a further alternative embodiment of the optochemical pH sensor shown in FIG. 4.

In an embodiment compatible with the embodiments described above, the optochemical sensor element 10 furthermore has a selection layer 40 (see FIG. 7). The selection layer 40 is arranged on the functional layer 30, opposite the substrate layer 20. The selection layer 40 is suitable to filter specific analytes of the measurement medium. The selection layer 40 is permeable to protons. The selection layer 40 can also function as a protective layer for the functional layer 30.

In an embodiment compatible with the embodiments described above, the optochemical sensor element 10 has at least one further layer. The further layer is arranged on the substrate layer 20 and/or the functional layer 30 and/or the selection layer 40 (not shown). The further layer is, for example, a protective layer, a darkening layer, a support layer, or a barrier layer.

In an embodiment compatible with the embodiments described above, the first reference dye RF1 has a material from a group: titanate, nitride, gallate, sulfide, sulfate, aluminate, silicate, preferably Han blue, Han purple, Egyptian blue, ruby red, aluminoborate, chromated yttrium aluminum borate, gadolinium aluminum borate, manganese (IV)-(doped) activated magnesium titanate, manganese (IV)-activated magnesium fluorogermanate, ruby, alexandrite, and/or europium (III)-activated yttrium oxides.

In an embodiment compatible with the embodiments described above, the indicator dye IF has a material from a group: BODIPY (dipyrromethene boron difluoride), aza-BODIPY, porphyrine, phthalocyanine, sterically hindered coumarins, perylene diimides, merocyanines, diketopyrrolopyrrole (DPP), quinacridones (QD), 7-[2-(decyloxycarbonyl)-phenyl]-10-diethylamino-3-hydroxy-benzo[c]xanthylium perchlorate (XP), azadioxatriangulenium (ADOTA), diazaoxatriangulenium (DAOTA), pyranine (HPTS), 6-8-dihydroxypyrene-1,3-disulfonic acids (DHPDS), fluoresceins and their derivatives, or mixtures.

An example of an indicator dye as aza-BODIPY:

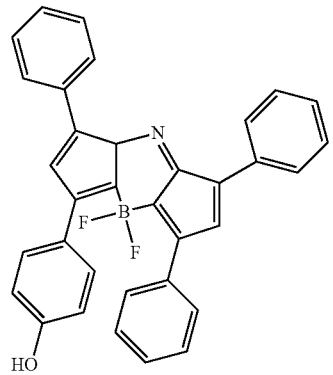

An example of an indicator dye as aza-BODIPY:

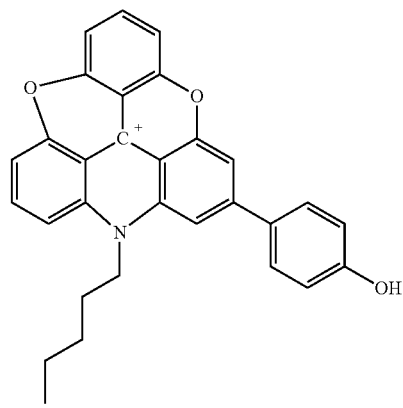 [SMILES: CCCCCN1c2cccc3c2C2c4c(cccc4Oc4cc(-c5ccc(O)cc5)cc1c42)O3]

An example of an indicator dye as DAOTA azadioxatriangulenium:

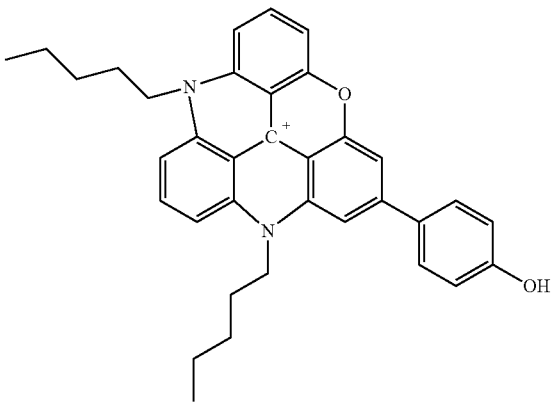 [SMILES: CCCCCN1c2cccc3c2C2c4c(cc(-c5ccc(O)cc5)cc4N(CCCCC)c4cccc1c42)O3]

An example of a second reference dye RF2:

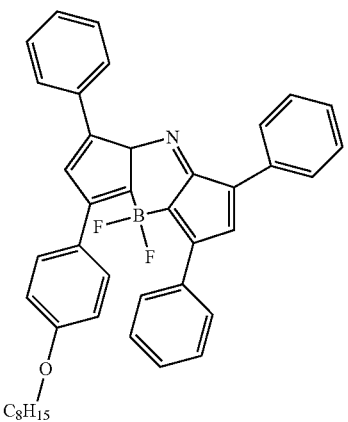

An example of a second reference dye RF2:

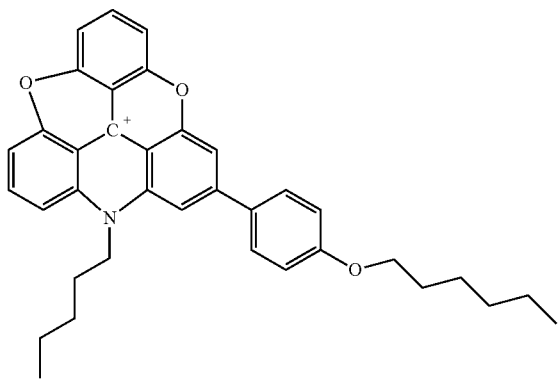 [SMILES: CCCCCCOc1ccc(-c2cc3c4c(c2)N(CCCCC)c2cccc5c2C4c2c(cccc2O3)O5)cc1]

An example of a second reference dye RF2:

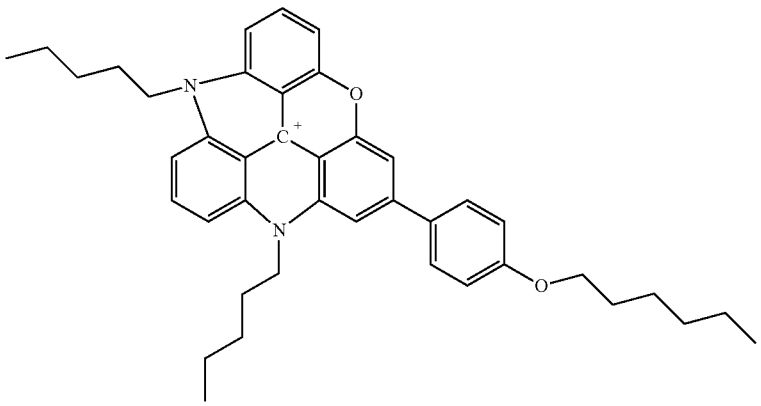 [SMILES: CCCCCCOc1ccc(-c2cc3c4c(c2)N(CCCCC)c2cccc5c2C4c2c(cccc2N5CCCCC)O3)cc1]

In an embodiment compatible with the embodiments described above, the second reference dye RF2 is a product of reaction of the indicator dye by esterification, etherification, or amidation.

Figure 5:
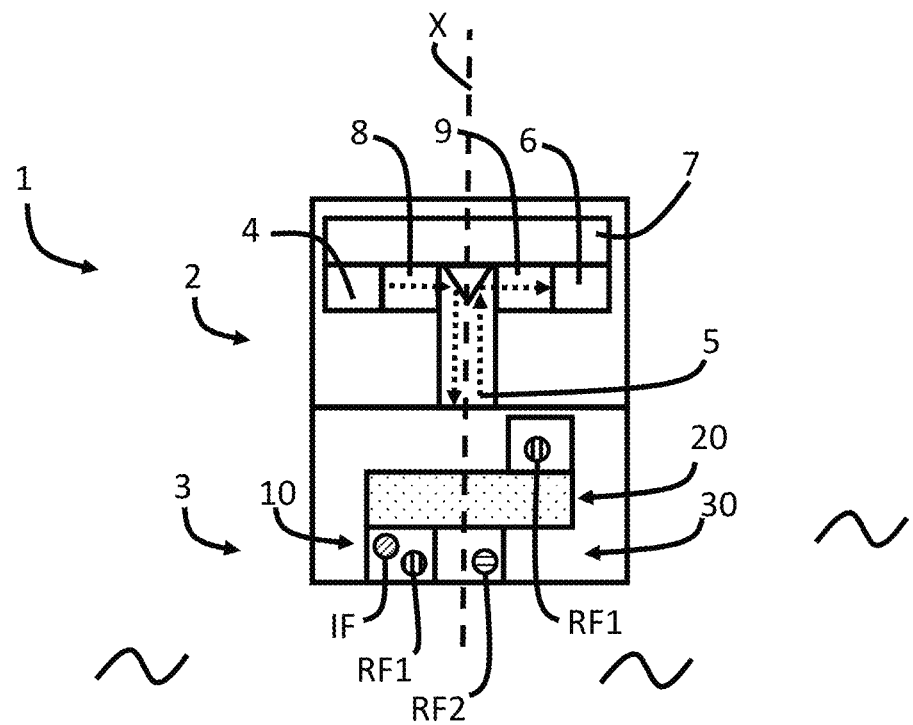
FIG. 5 shows a schematic illustration of an alternative embodiment of the optochemical pH sensor shown in FIG. 4.
Figure 6:
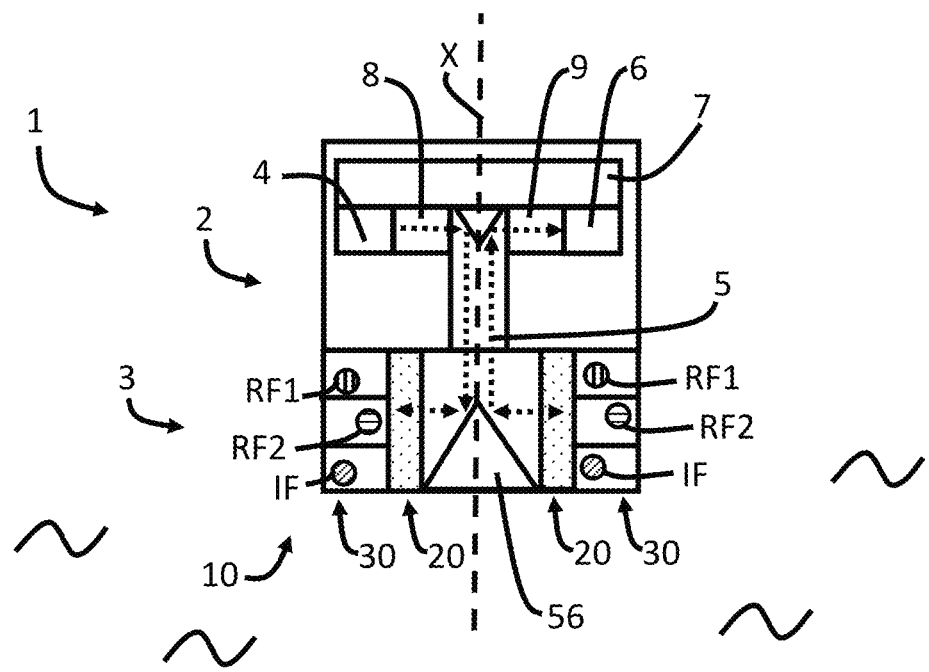
FIG. 6 shows a schematic illustration of a further alternative embodiment of the optochemical pH sensor shown in FIG. 4.

FIGS. 5-7 show exemplary embodiments of an optochemical pH sensor 1 according to the present disclosure.

In a further embodiment, the functional layer 30 of the optochemical sensor element 10 is subdivided into the following seven functional segments (not shown).

The first functional segment comprises an indicator dye IF having a polyurethane; a second reference dye RF2 having a polyurethane BODIPY, which has a decay time in the ns range; and a first reference dye RF1 having a decay time of Tau>1 µs.

The second functional segment comprises: an indicator dye IF having a polyurethane BODIPY having a decay time in the ns range; and a first reference dye RF1 having a decay time of Tau>1 µs.

The third functional segment comprises: a second reference dye RF2 having a polyurethane BODIPY having a decay time in the ns range; a first reference dye RF1 having a decay time of Tau>5 µs.

The fourth functional segment comprises: an indicator dye IF having a polyurethane BODIPY; a second reference dye RF2 having a BODIPY and a decay time in the ns range.

The fifth functional segment comprises an indicator dye IF having a polyurethane BODIPY.

The sixth functional segment comprises a second reference dye RF2 having a polyurethane BODIPY having a decay time in the ns region.

The seventh functional segment comprises a first reference dye RF1 having a decay time of Tau>5 µs, which is embedded in a polyurethane, for example: the optochemical pH sensor 1 is described below: the optochemical pH sensor 1 has a sensor body 2 and a sensor head 3. The sensor head 3 is preferably detachably fastened to the sensor body 2. An advantage of a detachable sensor head 3 is that if the sensor head 3 needs to be replaced, it can be exchanged without discarding the sensor body 2. Thus, the optochemical pH sensor 1 is also suitable, for example, for use in areas where disposable use of a sensor head is necessary.

The sensor head 3 comprises the optochemical sensor element 10 according to the present disclosure described above.

The sensor body 2 and the sensor head 3 extend, for example, along an axis X. The optochemical sensor element 10 preferably extends either transversely to the axis X (see FIG. 5) or circumferentially with respect to the axis X (see FIG. 6). If the optochemical sensor element 10 extends transversely to the axis X, the layers of the optochemical sensor element 10 are traversed by the axis X. If the optochemical sensor element 10 extends circumferentially with respect to the axis X, the layers of the optochemical sensor element 10 run concentrically around the axis X, for example.

As shown by way of example in FIGS. 5-7, the sensor body 2 comprises a light source 4, a photodetector 6, and a control unit 7. The control unit 7 is connected to the light source 4 and the photodetector 6. The control unit 7 is suitable to control the light source 4 and to evaluate the signals detected by the photodetector 6.

The light source 4 is suitable to emit at least one stimulation signal S1 in such a way that the functional layer 30 is irradiated by the stimulation signal S1. The light source 4 is an LED or an LED array, for example. The stimulation signal is, for example, directed onto the functional layer 30 via an optical waveguide 5.

The photodetector 6 is suitable to detect the luminescence signals L1, L2, L3 emitted by the functional layer 30. The photodetector 6 is, for example, a spectrometer, a CCD camera, or another detector.

The control unit 7 is, for example, suitable to filter the luminescence signals L1, L2, L3 detected by the photodetector 6 if the luminescence signals L1, L2, L3 have different wavelengths.

In the embodiments shown in FIGS. 5 and 6, the optochemical pH sensor 1 furthermore has a stimulation filter unit 8 and a detection filter unit 9. The stimulation filter unit 8 is suitable to filter the stimulation signal generated by the light source 4 in such a way that a first stimulation signal S1, a second stimulation signal S2, or a third stimulation signal S3 having a respectively different wavelength are generated. Of course, the stimulation filter unit 8 is not necessary if the light source 4 is suitable to generate different stimulation signals having different wavelengths. The detection filter unit 9 is suitable to filter superimposed luminescence signals having different wavelengths. Of course, the detection filter unit 9 is not necessary if the luminescence signals impinge on the photodetector 6 in a time-delayed manner; i.e., they are not superimposed. The detection filter unit 9 is also not necessary if the photodetector 6 can quantify detected superimposed luminescence signals of different wavelengths according to the wavelength of the detected luminescence signals, as is the case with a spectrometer, for example.

In the embodiments shown in FIGS. 5 and 6, the photodetector 6 has a detection filter unit 9, which is suitable to filter a first luminescence signal L1 emitted by the first reference dye RF1, a second luminescence signal L2 emitted by the second reference dye RF2, and a third luminescence signal L3 emitted by the indicator dye IF. The photodetector 6 has, for example, a sensitivity for radiation in the wavelength range of 600 nm to 1100 nm.

In the embodiment shown in FIG. 7, the optical waveguide 5 comprises four conductor fibers 51, 52, 53, 54. Four independent stimulation signals S1, S2, S3, S4 can thus be generated, for example by an LED array. The first conductor fiber 51 is arranged in such a way that a first stimulation signal S1 is directed onto a first functional segment 31; and the second conductor fiber 52 is arranged in such a way that a second stimulation signal S2 is directed onto a second functional segment 32; and the third conductor fiber 53 is arranged in such a way that a third stimulation signal S3 is directed onto a third functional segment 33; and the fourth conductor fiber 54 is arranged in such a way that a fourth stimulation signal S4 is directed onto a comparison segment.

The optical waveguide 5 shown in FIG. 7 is, for example, a Y-shaped optical waveguide 5. This implies that each conductor fiber 51, 52, 53, 54 has a junction. One branch of the junction extends to the light source 4 (shown in dashed lines), and a further branch of the junction extends to the photodetector 6. The common part of the Y-shaped optical waveguide 5 extends to the dedicated segment. It thus becomes possible, for example, to guide the first stimulation signal S1 via the first conductor fiber 51 to the first functional segment 31, and to guide the first luminescence signal L1 via the first conductor fiber 51 to the photodetector 6. The optical waveguide 5 has the same structure in all other conductor fibers 52, 53, and 54.

As can be seen in FIG. 7, the optochemical sensor element 10 is circular and the functional segments 31, 32, 33, 34 are bounded by a radial subdivision of the functional layer 30. The substrate layer 20 is coated with the functional layer 30 on the first substrate side 21. A selection layer 40 is mounted on the functional layer 30 so that the selection layer 40 is suitable to come into contact with the measurement medium.

FIG. 6 shows an embodiment of the optochemical pH sensor 1, in which the optochemical sensor element 10 extends radially to the axis X defined by the sensor body 2 and the sensor head 3. The optochemical sensor element 10 is, for example, arranged annularly in the sensor head 3. For example, the sensor head 3 is sleeve-shaped, and the optochemical sensor element 10 is arranged on an inner surface of the sensor head 3. In this embodiment, the optical waveguide 5 comprises a corresponding diversion 56 in order to conduct the stimulation signal(s) from the light source 4 to the functional layer 30, and the luminescence signal(s) from the functional layer 30 to the photodetector 6. An advantage of a radial arrangement of the functional layer 30 is the simpler production of the sensor spot sub-units, such as the functional segments, by means of customary methods, such as knife-coating and spray-coating. A crosstalk between the luminescence signals generated by the functional segments or comparison segments is prevented by a clear separation of the individual functional segments or comparison segments. A separate detection of the different luminescence signals respectively enables a simplified processing of the corresponding luminescence signal. Here, simpler processing means that the signal measurement can be evaluated with simpler formulas. Simpler formulas lead to a lower computing effort and a lower memory requirement (due to the small number of memory locations for parameters, coefficients, modulation frequencies, etc.).

A method for measuring a pH value by means of the optochemical pH sensor 1 described above is discussed below. This is described below by way of example for an optochemical pH sensor 1 having a functional layer 30, as shown in FIG. 1.

In a first step, the optochemical pH sensor 1 is provided. This means that the optochemical pH sensor 1 is functional and is in contact with a measurement medium.

Subsequently, the light source 4 is controlled by the control unit 7 in such a way that the light source 4 emits a first stimulation signal S1 onto the functional layer 30. The first stimulation signal S1 preferably has a wavelength in the range of 200 nm to 600 nm, preferably of 400 nm to 600 nm.

The first reference dye RF1, the second reference dye RF2, and the indicator dye IF are stimulated by the first stimulation signal S1, i.e., they are excited to emit a luminescence signal. The first reference dye RF1 thus emits a first luminescence signal L1, the second reference dye RF2 thus emits a second luminescence signal L2, and the indicator dye IF thus emits a third luminescence signal L3. The luminescence signals preferably respectively have different wavelengths.

The first luminescence signal L1, the second luminescence signal L2, and the third luminescence signal L3 are then detected by the photodetector 6. The photodetector 6 is, for example, suitable to analyze a spectrum of the detected radiation so that luminescence signals of different wavelengths can be recognized and filtered by the control unit 7.

In a next step, the detected luminescence signals L1, L2, L3 are evaluated by the control unit 7. This step comprises, for example, filtering of the different luminescence signals by the control unit 7 so that the luminescence signals L1, L2, L3 are present separately.

The control unit 7 compares the first luminescence signal L1 emitted by the first reference dye RF1 to the second luminescence signal L2 emitted by the second reference dye RF2. The comparison of the luminescence signals comprises, for example, comparing an amplitude (or phase difference/decay time) or an integral over the signal of the first luminescence signal L1 and of the second luminescence signal L2.

A reference signal difference between the first luminescence signal L1 generated by the first reference dye RF1 and the second luminescence signal L2 generated by the second reference dye RF2 is then determined.

Next, a measurement signal difference between the first luminescence signal L1 and the third luminescence signal L3 is determined. The measurement signal difference depends on the pH value of the measurement medium. The current pH value of the measurement medium can thus be derived from the measurement signal difference.

In the event that the optochemical sensor element 10 is subject to a drift caused by aging, for example, the measurement signal difference, and thus the pH value of the measurement medium, is distorted and requires drift compensation. This drift compensation is possible with the aid of the determined reference signal difference.

If, for example, there is no drift of the optochemical sensor element 10, the reference signal difference is equal to zero. In this case, the measurement signal difference is multiplied by a drift factor equal to one in order to take no drift into account.

However, if, for example, a drift of the optochemical sensor element 10 is present, the reference signal difference is not equal to zero or is preferably greater than a predetermined limit value. In this case, the measurement signal difference is multiplied by a drift factor not equal to one in order to compensate for a drift. Thanks to the reference signal difference (dual-lifetime referencing) or the reference signal ratio (ratiometric method), a drift of the indicator dye IF is thus recognized.

A pH value is subsequently determined based on the determined measurement signal difference and the reference signal difference, i.e., the determined drift factor.

The drift compensation makes it possible to use the optochemical pH sensor 1 even in the presence of the drift of the optochemical sensor element 10 and to determine a reliable pH value of the measurement medium at the same time. Thus, the optochemical pH sensor 1 can be used longer than conventional sensors, is more reliable, and enables a more accurate pH value measurement of the measurement medium.

In one embodiment, the method furthermore comprises a step of outputting a warning message by means of the control unit 7 if the reference signal difference is greater than a predetermined limit value. Thus, the user is informed that a drift is present and has been compensated. Depending on how strong the drift is, a request to change the sensor head 3 can also be output if a limit value is exceeded. Here, for example, a change in the measured value is measured over a time interval at a defined temperature. The control unit 7 is suitable to store measurement data and/or to smooth measurement data depending on the identified drift. By changing the sensor head 3, it is possible to exchange the optochemical sensor element 10 together with the aged functional layer 30.

In an alternative embodiment, the photodetector 6 has integrated detection filters in order to filter the luminescence signals L1, L2, L3. In this case, the photodetector 6 preferably has a plurality of detection regions, for example by different pixels. The detection filters are preferably arranged in such a way that specific detection filters are upstream of specific detection regions so that each detection region is suitable to detect a different luminescence signal.

In an alternative embodiment, the photodetector 6 has a detection filter unit 9 which precedes the photodetector 6 (see FIG. 5 and FIG. 6). The detection filter unit 9 makes it possible to separate the different luminescence signals.

In an alternative embodiment, the light source 4 emits at least three different stimulation signals with respectively different wavelengths. The light source 4 emits the stimulation signals either simultaneously or sequentially.

In an alternative embodiment, the light source 4 is constructed as an array of a plurality of LEDs and emits time-delayed stimulation signals with different LEDs.

Depending on whether or not the light source 4 has a plurality of LEDs that can be controlled independently or not, the control of the light source 4 can be adapted so that the stimulation signal or the stimulation signals are emitted simultaneously or independently.

Depending on whether the photodetector 6 has a plurality of detection regions, the detection of the luminescence signals by the photodetector 6 can be adapted by the detection filter unit 9 and the control of the light source 4 so that the luminescence signals can be processed separately.

In one embodiment, the optochemical sensor element 10 has a functional layer 30 with a single segment.

The aforementioned ratiometric measurement method is discussed below. In the ratiometric measurement method, the luminescence signals emitted by the dyes (first reference dye RF1, second reference dye RF2, indicator dye IF) are compared to one another. The amplitudes of the luminescence signals and the time curve of the luminescence signals are compared to one another. Thus, a reference signal ratio is obtained. If the ratio is equal to one, there is no drift. If the ratio is less than one, there is a drift.

The determined pH value is corrected on the basis of the drift determined by the ratiometric measurement method.

Some mathematical equations for the ratiometric method are presented below:

$$R_{F1,F2}(\text{pH}, t) = \alpha 1(t) + \frac{\alpha_2(t) - \alpha_1(t)}{(1 + 10\exp(\text{pH} - \alpha_3(t))\alpha_4(t)} \quad \text{(eq. 1.0)}$$

$$R = \frac{IF}{RF_1} \quad \text{(eq. 1.1)}$$

$$R = \frac{IF}{RF_2} \quad \text{(eq. 1.2)}$$

$$D = \frac{dR}{dt} \quad \text{(eq. 1.3)}$$

$$\alpha i(t) = \alpha i, Cal1 + \left(\frac{\alpha i, Cal1 - \alpha i, Cal2}{\Delta t(Cal1, Cal2)}\right) * t \quad \text{(eq. 2.0)}$$

Legend regarding the equations of the ratiometric method:
$R_{F1,F2}(\text{pH},t)$=ratiometric pH response (F1 can be IF, F2 can be a reference dye);

α1(t), α2(t)=asymptotic minimum and maximum of the sigmoid function;

α3(t)=pKa value of the indicator (the inflection point of the sigmoid function);

α4(t)=a constant describing the slope of the sigmoid function between α1(t) and α2(t);

Cal=measured value at time t0 or ti;

D=drift.

In order to correct a drift over time, the calibration data at point in time t0 before the test series (Cal1) are linked to the calibration data at point in time t1 after the test series (Cal2) (see equation 2.0 above). Instead of a calibration, a correction can take place during ongoing sensor operation. For example, the aging of the less stable organic reference dye RF2 can be used as a correction means since it also supplies different signals at different measurement times independently of the analyte concentration. Drift correction can take place over the entire term or only over individual parameters. For example, it is also possible to correct only the value α1(t), α2(t). Further possibilities for drift correction are possible, for example, with a polynomial, a linear function, or an $e^x$ function.

$$pH(R_{F1,F2}, t) = pKa(t) + \frac{\log((\alpha_2(t) - \alpha_1(t))/(R_{F1,F2} - \alpha_1(t)) - 1)}{\alpha_4(t)} \quad \text{(eq. 3.0)}$$

As an alternative to the ratiometric method, what is known as dual-lifetime referencing (DLR) can also be applied.

The calibration curves are fitted and shown as a Boltzmann sigmoid function. The simplest form is shown below:

$$\cot\varphi = \text{Bottom} + \frac{\text{Top} - \text{Bottom}}{1 + 10^{\frac{pH - V50}{\text{Slope}}}} \quad \text{(eq. 4.0)}$$

However, taking temperature and/or salinity influences into account, the function can also be represented as follows:

$$\cot\varphi = \quad \text{(eq. 5.0)}$$
$$\text{Bottom} + B_t(T-20) + \frac{\text{Top} + T_t(T-20) - (\text{Bottom} + B_t(T-20))}{1 + 10^{\frac{pH - (V50 + V50_t(T-20))}{\text{Slope}}}}$$

$$\cot\varphi = \text{Bottom} + B_t(T-20) + B_S(S-35) + \quad \text{(eq. 6.0)}$$
$$\frac{(\text{Top} + T_t(T-20) + T_S(S-35)) - (\text{Bottom} + B_t(T-20) + B_S(S-35))}{1 + 10^{\frac{pH - (V50 + V50_t(T-20) + V50_S(S-35))}{\text{Slope}}}}$$

Legend

Bottom=the minimum limit value of the calibration (cot φ)

TOP=the maximum limit value of the calibration (cot φ)

V50=inflection point, pKa value of the indicator (the inflection point of the sigmoid function)

Slope=slope at inflection point

T=temperature

S=salinity $B_t$, $T_t$, $V50_t$=linear temperature coefficients $B_S$, $T_S$, $V50_S$=linear salinity coefficients Drift correction can be performed in both the individual parameters and the overall term. This depends on the selection of the dye. In individual cases, the coefficients depending on temperature and salinity (see dual-lifetime referencing) can also be included in the correction. It does not necessarily need to be a linear function as shown in the formulas. Alternatively, it can also be a polynomial or $e^x$ function, for example.

The evaluation of the luminescence signals L1, L2, L3 detected by the photodetector 6 can also take place by evaluating the phase angle shift between the stimulation signal S1, S2, S3 and the detected luminescence signal L1, L2, L3.

The invention claimed is:

1. An optochemical sensor element for an optochemical pH sensor, comprising:
   a substrate layer having a first substrate side facing toward a measurement medium and a second substrate side opposite the first substrate side; and
   a functional layer, which is arranged on the first substrate side and has a first reference dye, an indicator dye, and a second reference dye different from the first reference dye,
   wherein the first reference dye comprises an inorganic material, is insensitive to pH, and is adapted to emit a first luminescence signal upon stimulation with a first stimulation signal,
   wherein the indicator dye comprises an organic material, is sensitive to pH, and is adapted to emit a third luminescence signal upon stimulation with the first stimulation signal,
   wherein the second reference dye comprises an organic material, is insensitive to pH, and is adapted to emit a second luminescence signal upon stimulation with the first stimulation signal,
   wherein the second reference dye is a product of reaction of the indicator dye by esterification, etherification, or amidation, and
   wherein the substrate layer is transparent to the first stimulation signal and the first, second and third luminescence signals.

2. The optochemical sensor element according to claim 1, wherein the functional layer is subdivided into at least two functional segments,
   wherein a first functional segment has the first reference dye, the indicator dye, and the second reference dye,
   wherein a second functional segment has the first reference dye and the indicator dye,
   or the first reference dye and the second reference dye,
   or the indicator dye and the second reference dye.

3. The optochemical sensor element according to claim 1, wherein a comparison layer with a first comparison segment is arranged on the second substrate side of the substrate layer, wherein the first comparison segment has the first reference dye, the second reference dye, or the indicator dye.

4. The optochemical sensor element according to claim 3, wherein the comparison layer has a plurality of comparison segments, wherein each comparison segment has the first reference dye, the second reference dye, or the indicator dye.

5. The optochemical sensor element according to claim 1, wherein the functional layer is subdivided into at least three functional segments, wherein a first functional segment has the first reference dye, a second functional segment has the indicator dye, and a third functional segment has the second reference dye.

6. The optochemical sensor element according to claim 1, wherein the functional layer has more than three functional segments and each functional segment has a different dye or a different combination of dyes.

7. The optochemical sensor element according to claim 1, wherein the functional layer is circular and functional segments are formed by a radial subdivision of the functional layer, or wherein the functional layer is rectangular and functional segments are formed by a rectangular subdivision of the functional layer.

8. The optochemical sensor element according to claim 1, wherein the functional layer has a proton-conducting matrix and the first reference dye and/or the indicator dye and/or the second reference dye is arranged homogeneously in the proton-conducting matrix.

9. The optochemical sensor element according to claim 1, wherein the optochemical sensor element furthermore has a selection layer, which is arranged on the functional layer opposite the substrate layer and is permeable to protons.

10. The optochemical sensor element according to claim 9, wherein functional segments of the functional layer have a first side surface in contact with the substrate layer or a further layer and have a second side surface opposite the first side surface in contact with the selection layer or a further layer or a measurement medium.

11. The optochemical sensor element according to claim 1, wherein the first reference dye has a material from a group: titanate, nitride, gallate, sulfide, sulfate, aluminate and/or silicate.

12. The optochemical sensor element according to claim 1, wherein the indicator dye has a material from a group: BODIPY, aza-BODIPY, porphyrine, phthalocyanine, sterically hindered coumarins, perylene diimides, merocyanines, diketopyrrolopyrrole, quinacridones, 7-[2-(decyloxycarbonyl)-phenyl]-10-diethylamino-3-hydroxy-benzo[c]xanthylium perchlorate (XP), azadioxatriangulenium (ADOTA), diazaoxatriangulenium (DAOTA), pyranine (HPTS), 6-8-dihydroxypyrene-1,3-disulfonic acids (DHPDS), fluoresceins and their derivatives, or mixtures thereof.

13. The optochemical sensor element according to claim 1, wherein the optochemical sensor element has at least one further layer, which is arranged on the substrate layer and/or the functional layer and/or a selection layer, wherein the at least one further layer is a protective layer, a darkening layer, a support layer, or a barrier layer.

14. An optochemical pH sensor, comprising:
   a sensor body having a light source, a photodetector, and a control unit, wherein the control unit is connected to the light source and the photodetector, and is adapted to control the light source and evaluate first, second and third luminescence signals detected by the photodetector; and
   a sensor head having an optochemical sensor element comprising:
      a substrate layer having a first substrate side facing toward a measurement medium and a second substrate side opposite the first substrate side; and
      a functional layer, which is arranged on the first substrate side and has a first reference dye, an indicator dye, and a second reference dye different from the first reference dye,
      wherein the first reference dye comprises an inorganic material, is insensitive to pH, and is adapted to emit the first luminescence signal upon stimulation with a first stimulation signal,
      wherein the indicator dye comprises an organic material, is sensitive to pH, and is adapted to emit the third luminescence signal upon stimulation with the first stimulation signal,
      wherein the second reference dye comprises an organic material, is insensitive to pH, and is adapted to emit the second luminescence signal upon stimulation with the first stimulation signal,
      wherein the second reference dye is a product of reaction of the indicator dye by esterification, etherification, or amidation,
      wherein the substrate layer is transparent to the first stimulation signal and the first, second and third luminescence signals;
      wherein the sensor body and the sensor head are arranged in such a way that the light source is adapted to emit at least one simulation signal in such a way that the optochemical sensor element is irradiated by the at least one stimulation signal, and
      wherein the photodetector is adapted to detect the first, second and third luminescence signals emitted by the optochemical sensor element.

15. The optochemical pH sensor according to claim 14, wherein the photodetector has a filter unit, which is adapted to filter a first luminescence signal emitted by the first reference dye, a second luminescence signal emitted by the second reference dye, and a third luminescence signal emitted by the indicator dye.

16. The optochemical pH sensor according to claim 14, wherein the optochemical pH sensor furthermore has an optical waveguide having at least two conductor fibers and the light source is adapted to generate at least two independent stimulation signals,
   wherein a first conductor fiber is arranged in such a way that a first independent stimulation signal is directed onto a first functional segment,
   and a second conductor fiber is arranged in such a way that a second independent stimulation signal is directed onto a second functional segment.

17. The optochemical pH sensor according to claim 16, wherein the optical waveguide has a third conductor fiber and a comparison segment is arranged at one end of the third conductor fiber.

18. A method for measuring a pH value of a measurement medium by means of the optochemical pH sensor of claim 14, comprising at least the following steps:
   providing the optochemical pH sensor of claim 14,
   controlling the light source by means of the control unit so that the first stimulation signal is emitted onto the optochemical sensor element in order to stimulate the first reference dye, the second reference dye, and the indicator dye,
   detecting the first luminescence signal, the second luminescence signal, and the third luminescence signal by means of the photodetector,
   comparing, by means of the control unit, the first luminescence signal to the second luminescence signal,
   determining a reference signal difference or a reference signal ratio between the first luminescence signal and the second luminescence signal,
   determining a measurement signal difference or a measurement signal ratio between the first luminescence signal and the third luminescence signal, and
   determining the pH value of the measurement medium based on the determined measurement signal difference and the reference signal difference or on the measurement signal ratio and the reference signal ratio.

19. The method according to claim 18, wherein a warning message is output by the control unit if the measurement signal difference, the reference signal difference, the measurement signal ratio, or the reference signal ratio exceeds or falls below a predetermined limit value.

20. The method according to claim 18, wherein the optochemical pH sensor furthermore has an optical waveguide having at least two conductor fibers, and the light source is adapted to generate at least two independent stimulation signals, wherein a first conductor fiber is arranged in such a way that a first independent stimulation signal is directed onto a first functional segment, and a second conductor fiber is arranged in such a way that a second independent stimulation signal is directed onto a second functional segment, wherein the step of controlling the light source by means of the control unit is performed in such a way that the first independent stimulation signal is emitted onto the first functional segment by means of the first conductor fiber, and the second independent stimulation signal is emitted onto the second functional segment by means of the second conductor fiber in a time-delayed manner or simultaneously with the first independent stimulation signal.

\* \* \* \* \*